(12) United States Patent
Westberg et al.

(10) Patent No.: US 9,083,552 B2
(45) Date of Patent: Jul. 14, 2015

(54) MOBILITY PLANE ARCHITECTURE FOR TELECOMMUNICATIONS SYSTEM

(75) Inventors: Lars Westberg, Enköping (SE); Eleri Cardozo, Campinas (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 920 days.

(21) Appl. No.: 12/599,379

(22) PCT Filed: May 28, 2007

(86) PCT No.: PCT/SE2007/050367
§ 371 (c)(1),
(2), (4) Date: Nov. 9, 2009

(87) PCT Pub. No.: WO2008/147263
PCT Pub. Date: Dec. 4, 2008

(65) Prior Publication Data
US 2011/0013557 A1    Jan. 20, 2011

(51) Int. Cl.
*H04W 4/00* (2009.01)
*H04L 12/46* (2006.01)
*H04L 12/715* (2013.01)
*H04L 12/723* (2013.01)
*H04W 40/02* (2009.01)
(Continued)

(52) U.S. Cl.
CPC ............ *H04L 12/4633* (2013.01); *H04L 45/04* (2013.01); *H04L 45/50* (2013.01); *H04L 45/64* (2013.01); *H04W 40/02* (2013.01); *H04W 8/085* (2013.01); *H04W 80/04* (2013.01)

(58) Field of Classification Search
CPC ....................................... H04W 4/00
USPC ................................. 370/310, 328, 392–427
See application file for complete search history.

(56) References Cited

U.S. PATENT DOCUMENTS

| 7,590,149 B1 * | 9/2009 | Bharali et al. ................ 370/468 |
| 2005/0169266 A1 | 8/2005 | Aggarwal et al. |

(Continued)

FOREIGN PATENT DOCUMENTS

| EP | 1 408 666 | 4/2004 |
| EP | 1 408 666 A1 | 4/2004 |

(Continued)

OTHER PUBLICATIONS

International Search Report for PCT/SE2007/050367, mailed Mar. 10, 2008.

(Continued)

*Primary Examiner* — Iqbal Zaidi
(74) *Attorney, Agent, or Firm* — Nixon & Vanderhye, P.C.

(57) ABSTRACT

In a telecommunications system (20) a transport network (26) for connecting a wireless access network (22) to a backbone network (24), an example embodiment of an overlay mobile network (40) comprises a point-to-multipoint tunnel having tunnel segments formed in a tree topology and being configured to direct traffic to a mobile node (30). The overlay mobile network (40) further comprises mobility aware routers (44) of the transport network (40), the mobility aware routers (44) serving as nodes of the tree topology of the tunnel and being configured to perform mobility functions such as mobility routing and layer 3 (L3) address assignment. These mobility functions interact in a mobility control and management plane.

24 Claims, 10 Drawing Sheets

(51) Int. Cl.
*H04W 8/08* (2009.01)
*H04W 80/04* (2009.01)

(56) References Cited

U.S. PATENT DOCUMENTS

2005/0270992 A1* 12/2005 Sanzgiri et al. ............ 370/310.2
2010/0172293 A1* 7/2010 Toth et al. .................... 370/328
2012/0008630 A1* 1/2012 Ould-Brahim ................ 370/392

FOREIGN PATENT DOCUMENTS

EP    1 684 471        7/2006
EP    1 684 471 A1     7/2006

OTHER PUBLICATIONS

Honggyi, Li: "Local Mobility Management Framework", Internet Draft, (Jul. 2001), pp. 1-11.
Eardley, P. et al, "On the scalability of IP micro-mobility management protocols", Mobile and Wireless Communication Network, (2002), pp. 470-474.
Rosen et al, Multiprotocol Label Switching Architecture, RFC 3031, Jan. 2001.
Berger, Generalized Multi-Protocol Label Switching (GMPLS) Signaling Functional Description, RFC 3471, Jan. 2003.
Johnson et al, Mobility Support in IPv6, RFC 3775, Jun. 2004.
Koodli, Fast Handovers for Mobile IPv6, RFC 4068, Jul. 2005.
Soliman at al, Hierarchical Mobile IPv6 Mobility Management (HMIPv6), RFC 4140, Aug. 2005.
Network-based Localized Mobility Management (netlmm), 2007.
Mobility for IP: Performance, Signaling and Handoff Optimization (mipshop), 2006.
Awduche et al, RSVP-TE: Extensions to RSVP for LSP Tunnels, RFC 3209, Dec. 2001.
Yasukawa, Signaling Requirements for Point-to-Multipoint Traffic-Engineered MPLS Label Switch Paths (LSPs), RFC 4461, Apr. 2006.
Aggarwal et al, Extensions to RSVP-TE for Point-to-Multipoint TE LSPs, Internet Draft (draft-ietf-mpls-rsvp-te-p2mp-06.txt), Jul. 2006.
Droms, Dynamic Host Configuration Protocol, RFC 2131, Mar. 1997.
Droms, Dynamic Host Configuration Protocol for IPv6, RFC 3315, Jul. 2003.
Farinacci et al, Generic Routing Encapsulation (GRE), RFC 2784, Mar. 2000.
Rigney, Remote Authentication Dial in User Service (RADIUS), RFC 2865, Jun. 2000.
Postel, Internet Control Message Protocol, RFC 792, Sep. 1981.

* cited by examiner

| 0 | | 15 | 23 | 31 |
|---|---|---|---|---|
| Length | | | Class Number | C-Type |
| Flags | | | Mobile Node ID | |
| Mobile Node ID | | | | |
| Mobile Node Address Type | | | Mobile Node Prefix Length | |
| Mobile Node Prefix | | | | |
| Egress MAR ID | | | | |

MOBILITY PLANE ARCHITECTURE FOR TELECOMMUNICATIONS SYSTEM

This application is the U.S. national phase of International Application No. PCT/SE2007/050367 filed 28 May 2007, the entire contents of which is hereby incorporated by reference.

TECHNICAL FIELD

The present invention pertains to telecommunications, and particularly the support of mobility in networks such as IP (Internet Protocol), MPLS (Multiprotocol Label Switching), and GMPLS (Generalized MPLS) networks. MPLS (Multiprotocol Label Switching) networks are described, in e.g., E. Rosen et al, Multiprotocol Label Switching Architecture, RFC 3031, January 2001. GMPLS (Generalized MPLS) networks are described in, e.g., L. Berger, Generalized Multi-Protocol Label Switching (GMPLS) Signaling Functional Description, RFC 3471, January 2003.

BACKGROUND

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks. The core network has two service domains, with an RNC having an interface to both of these domains.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

As those skilled in the art appreciate, in WCDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Internet Engineering Task Force (IETF) has published several standards for supporting mobility in IP networks. All these standards focus on the version 6 of the Internet Protocol (IPv6). The standards are divided into two categories, those supporting macro-mobility and those supporting micro-mobility. Macro-mobility refers to mobility across several networks, while micro-mobility refers to mobility within a single and potentially large network. Macro-mobility protocols allow a mobile node attached to a foreign network to communicate with other hosts using its home (permanent) IPv6 address. The IETF's macro-mobility protocol is the Mobile IPv6 (MIPv6) protocol. See, e.g., D. Johnson et al, Mobility Support in IPv6, RFC 3775, June 2004.

Micro-mobility protocols aim to improve localized mobility by reducing the handover overheads. Fast Handover and Hierarchical MIPv6 (FMIPv6 and HMIPv6) are two micro-mobility protocols standardized by the IETF. See, respectively, e.g., R. Koodli, Fast Handovers for Mobile IPv6, RFC 4068, July 2005, and H. Soliman at al, Hierarchical Mobile IPv6 Mobility Management (HMIPv6), RFC 4140, August 2005.

Currently, IETF charters such as NETLMM (Network-based Localized Mobility Management) and MIPSHOP (Mobility for IP: Performance, Signaling, and Handoff Optimizations) are proposing new micro-mobility architectures for IPv6. See, respectively, e.g., Network-based Localized Mobility Management, http://www.ietf.org/html.charters/netlmm-charter.html; and Mobility for IP: Performance, Signaling and Handoff Optimization, http://www.ietforg/html-.charters/mipshop-charter.html.

Existing solutions for IP mobility suffer significant drawbacks that make these solutions simply undeployable. As one drawback, the complexity of the proposed solutions render implementation on small mobile devices (such as cell phones and handhelds) unfeasible. In fact, manufactures of such devices never anticipated supporting the present solutions.

Another serious drawback is the delay on the deployment of IPv6. Consensus ten years ago was that that IPv6 was inevitable (due to the shortage of IPv4 addresses [mainly the class B addresses] caused by the exponential growth of the Internet). However, solutions devised in the meantime proved the contrary. CIDR (Classless Interdomain Routing) allows a block of class C addresses be grouped and advertised as a single prefix, while NAT (Network Address Translation) allows the use of unlimited private address spaces. As such, IPv4 networks remain growing and operating without the limits identified a decade ago.

Support for micro-mobility is a key issue in mobile networks since it speeds up the handover process, minimizing communication disruptions when a mobile node changes its network point of attachment.

What is needed, therefore, and an object of the present invention, is one or more of apparatus, methods, systems, and techniques for supporting micro-mobility in a telecommunications network without complexity or dependence upon IPv6.

SUMMARY

A network architecture supports micro-mobility in a network-centric way (e.g., overhead demanded by micro-mobility is placed on the network, not on the mobile nodes). The network architecture comprises an overlay network build above a transport network, the overlay network being configured to direct traffic to mobile nodes. The overlay network employs point-to-multipoint (P2MP) tunnels to encapsulate traffic directed to mobile nodes. The architecture can be used to support micro-mobility in one or more of an Internet Protocol (IP) network, a MPLS (Multiprotocol Label Switching) network, and a GMPLS (Generalized MPLS) network.

In a telecommunications system a transport network is needed for connecting a wireless access network to a backbone network, an example embodiment of an overlay mobile network comprises a point-to-multipoint tunnel having tunnel segments formed in a tree topology and being configured to direct traffic to the mobile nodes. The overlay mobile network further comprises mobility aware routers of the transport network, the mobility aware routers serving as nodes of the tree topology of the tunnel and being configured to perform mobility functions which interact in a mobility plane to provide transparent handover to the mobile nodes.

In example embodiments, the mobility aware routers of the transport network comprise an ingress mobility aware router, one or more branch mobility aware routers; and one or more egress mobility aware routers.

In an example implementation, the mobility functions performed by the mobility aware routers comprise a Tunnel Management (TM) Function; a Mobile Routing (MR) Function; an Address Configuration (AC) Function; and a Handover Helper (HH) Function. The Tunnel Management (TM) Function is configured to establish, shutdown, and (when necessary) re-route the tunnel. The Mobile Routing (MR) Function is configured to track an actual point of attachment of the mobile nodes and to route traffic to the mobile nodes' correct location. The Address Configuration (AC) Function is configured to supply Layer 3 (L3) addresses to a mobile node when the mobile node connects or reconnects to the access network. The Handover Helper (HH) Function is configured to facilitate a handover process.

In an example embodiment, the mobility aware routers maintain routes to mobile nodes and are configured to direct traffic to a specific mobile node rather than to replicate the traffic along plural segments of the tree. The mobility aware routers are configured to maintain a mobile routing table, and update their respective mobile routing table as a Mobile Node Location Object travels the tunnel in an upstream direction. Preferably travel of the Mobile Node Location Object is initiated upon the mobile node making an attachment with the overlay mobile network.

In an example implementation, the Mobile Node Location Object is configured to include a mobile node prefix for identifying the mobile node and an identifier of an egress mobility aware router through which the mobile node connects to the overlay mobile network.

In an example embodiment, the overlay mobile network can comprise plural point-to-multipoint tunnels, each of the point-to-multipoint tunnels being rooted by an ingress mobility aware router. Plural ingress mobility aware routers are configured to cooperate with one another for determining how to direct traffic to the mobile node.

In an example implementation having plural tunnels, the plural ingress mobility aware routers include a first ingress mobility aware router to install a route to the mobile node and a second ingress mobility aware router. The first ingress mobility aware router is configured to send a message to the second ingress mobility aware router to instruct the second ingress mobility aware router to redirect traffic, received by the second ingress mobility aware router but directed to the mobile node, to the first ingress mobility aware router.

In another example implementation having plural tunnels, at least one of the plural ingress mobility aware routers is configured with a tunnel to others of the plural ingress mobility aware routers. When the at least one of the plural ingress mobility aware routers does not serve the mobile node but receives traffic for the mobile node, the at least one of the plural ingress mobility aware routers is configured to multicast the traffic to the others of the plural ingress mobility aware routers. A mixed scheme combining traffic redirection and multicasting is possible as well.

Advantageously, the overlay mobile network is configured whereby functions of tunnel management, quality of service/class of service management, and mobile node location tracking are performed using a same protocol.

The architecture addresses the numerous issues related to mobility in IP networks, including (for example): (1) tunnel management (tunnel establishment, tunnel shutdown, and tunnel topology updating); (2) assuring secure mobile node attachment and handover; (3) tracking of mobile node actual point of attachment (location); (4) routing on the overlay network (decoupled from routing on the transport network); and (5) Quality of service (QoS) and class of service (CoS) offered to the mobile nodes.

The technology thus comprises, e.g., architecture and protocols for supporting mobility (e.g., micro-mobility) in networks, such as IP, MPLS, and GMPLS networks, for example. Support for such micro-mobility is strategic in mobile IP networks since it significantly affects the handover process. A quicker and more efficient handover facilitated by efficient mobility handling advantageously minimizes communication disruptions when a mobile node changes its network point of attachment. As one aspect of the technology, the mobility is handled inside the network and the decision is based on the topology and not made by the mobile node as in Mobile IPv6 (MIPv6) protocol.

Further advantages of the technology include support for micro-mobility even in situations in which global mobility with MIP may cause layer 3 Internet Protocol changes of the IP-address. Although the global mobility may give long handover interruption time, this solution can shorten handover interruption if the micro-mobility solution hides the mobility and thus the macro-mobility does not needs to be triggered. Further, the present technology avoids the tendency of other mobility architectures to require new functions for the mobile node (many of such functions not yet being widely available). Yet further, the technology is compatible with many types of networks, such as IP, MPLS, and GMPLS networks, for example. Moreover, in view of aspects such as tunneling, traffic engineering can be advantageously and easily performed.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
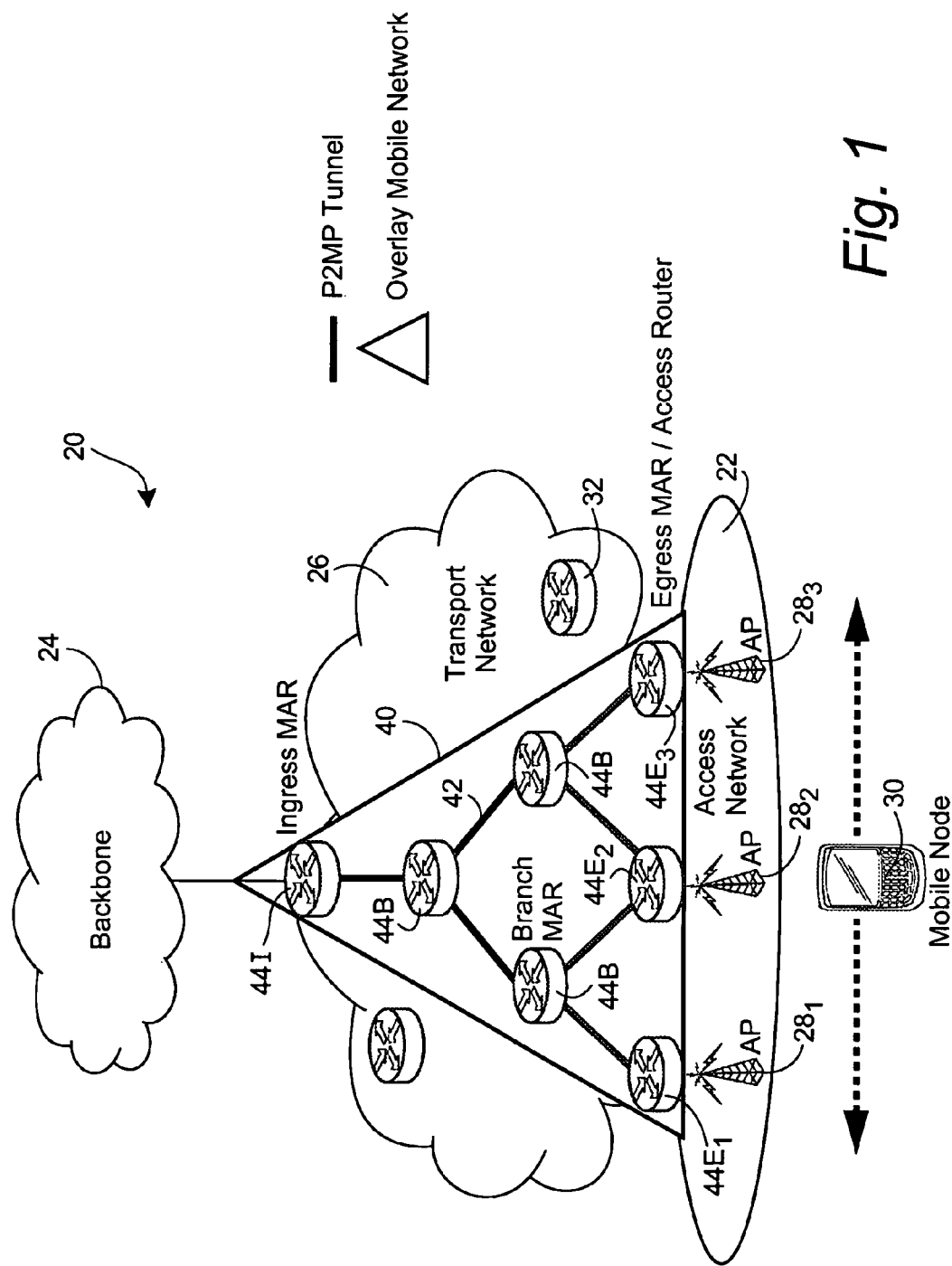
FIG. 1 is a diagrammatic view of an example telecommunications system including an example embodiment of micro-mobility-supporting architecture.

FIG. 1 shows a telecommunications system 20 wherein an access network 22 is connected to backbone network 24 by transport network 26 (shown enveloped by a cloud in FIG. 1). The access network 22 comprises plural wireless access points (AP) 28, such as radio base stations (e.g., NodeBs), for example. In the particular non-limiting example of FIG. 1, access network 22 comprises three access point; (AP) $28_1$-$28_3$, but it will be appreciated that a lesser or greater number of access points (APs) can be provided. Through access network 22 a mobile node, such as mobile node 30 shown in FIG. 1, obtains access to telecommunications system 20. A mobile node is a node, such as a mobile station, mobile terminal, or user equipment unit (UE), which changes its Layer 2 point of attachment over time, from which changes some are also Layer 3 (L3) changes as well. L3 assumes that the Mobile-IP addresses are kept because TCP and other protocols are designed for stable IP-addresses but IP-tunneling is (in MIP) added when the mobile is moving. This kind of tunneling usually involves IP-tunnels and tunnels made within the network but usually controlled by the host.

Layer 2 (L2) refers to the data link layer of the OSI model. In the OSI model, layer 1 (L1) is a physical layer; layer 2 (L2) is the data link layer; layer 3 (L3) is the network layer; layer 4 (L4) is the transport layer; layer 5 (L5) is a session layer; layer 6 (L6) is the presentation layer; and layer 7 (L7) is the application layer. Layer L2, the data link layer, is the layer which transfers data between adjacent network nodes/entities. Layer L3, the network layer, responds to service requests from the transport layer and issues service requests to the data link layer (L2). The network layer (L3) is responsible for end-to-end (source to destination) packet delivery, whereas the data link layer (L2) is responsible for node-to-node packet delivery.

The transport network 26 is a network from which a network operator offers mobility services to a mobile node such as mobile node 30. In the illustrated, non-limiting example implementation of FIG. 1, the transport network 26 is an Internet Protocol network, but in other implementations can be another type of network, such as a MPLS (Multiprotocol Label Switching) network or a GMPLS (Generalized MPLS) network. The transport network 26 comprises plural routers 32.

FIG. 1 further illustrates an overlay mobile network 40 which supports micro-mobility. The overlay mobile network 40, shown as or encompassed by a triangle in FIG. 1, is configured to direct traffic to mobile nodes such as mobile node 30. The overlay mobile network 40 is a logical network comprising one or more point-to-multipoint (P2MP) tunnels 42 established through the transport network 26. The P2MP tunnels 42 of overlay mobile network 40 connect certain routers of transport network 26 which are equipped or fitted with mobility related functionalities such as tunneling and traffic redirection. Such mobility-equipped router is herein termed a "mobility aware router" (MAR) 44.

Each P2MP tunnel 42 of overlay mobile network 40 has a topology forming a tree. Nodes in the tree are the mobility aware routers (MARs) 44, with the nodes being connected by arcs or tunnel segments. In relation to the tunnel tree topology, the mobility aware routers (MARs) can generally be classified as an ingress mobility aware router (MAR) 44I; a branch mobility aware router (MAR) 44B; and an egress mobility aware router (MAR) 44E. As such, each P2MP tunnel 42 has a single ingress (root) MAR 44I, one or more branch MARs 44B (nodes with branching level greater than one), and one or more egress MARs 44E (leaves of the tree). In the particular non-limiting example embodiment shown in FIG. 1, P2MP tunnel 42 has three branch mobility aware routers (MARs) 44B and three egress mobility aware routers (MAR) 44E. It will be appreciated that in other embodiments a different number of ingress mobility aware routers (MAR) 44I, branch mobility aware routers (MAR) 44B, and egress mobility aware routers (MAR) 44E can be provided. A packet being forwarded through P2MP tunnel 42 may or may not be replicated at a branch MAR(s) 44B according to the policies enforced by these mobility aware routers (MARs).

In the telecommunications system 20 of FIG. 1, an "access router" is any one of the mobility aware routers (MAR) 44 which is connected to a wireless access point (AP) 28, and thus typically is an egress mobility aware router (MAR) 44E. In the illustrated example embodiment of FIG. 1, access network 22 is thus an Internet Protocol subnetwork comprised of access routers and access points (AP) 28.

Mobility Functionalities

Figure 2:
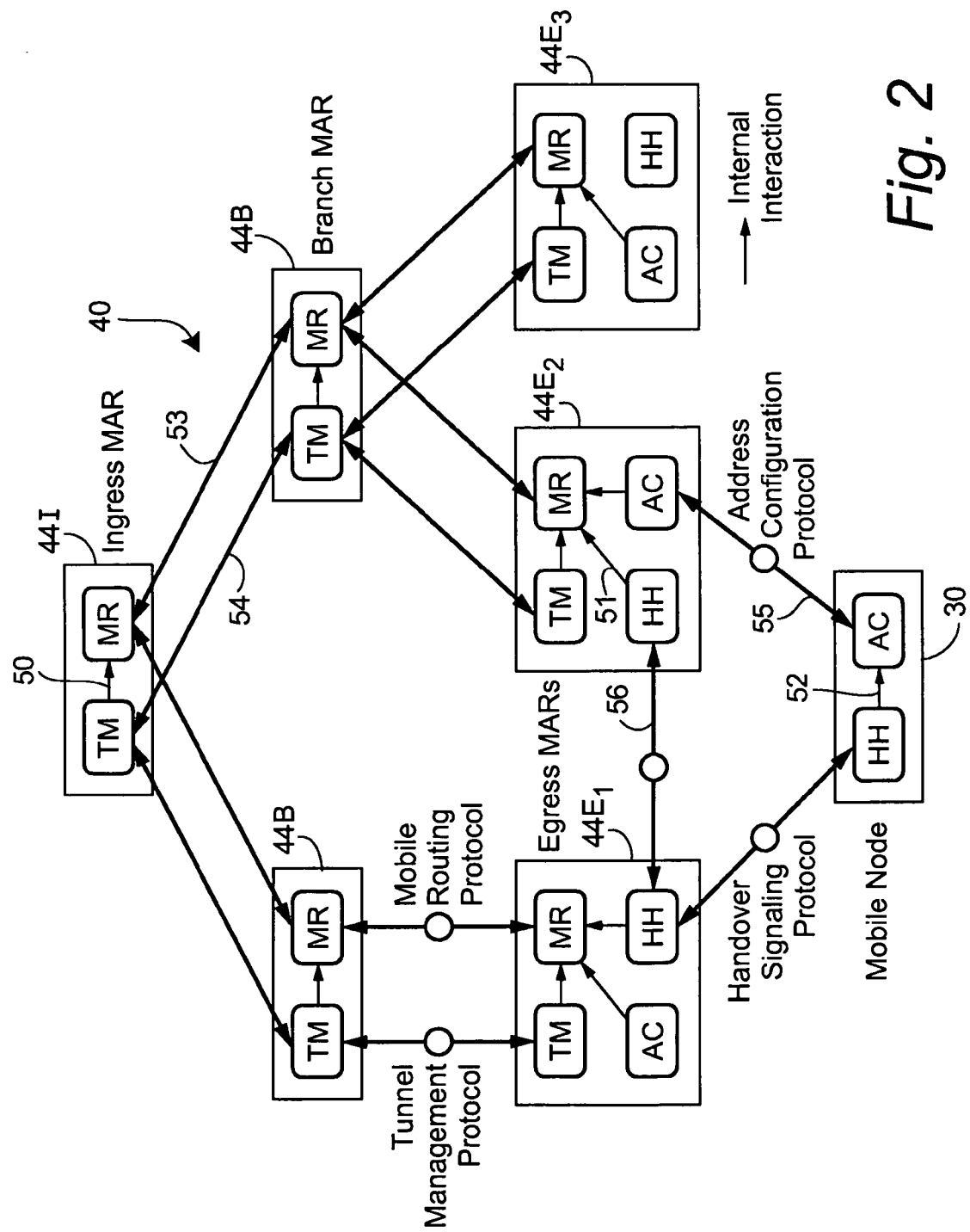
FIG. 2 is a diagrammatic view of an example embodiment of an overlay mobile network 40 including functionalities thereof.

FIG. 2 shows four functionalities or functions comprising overlay mobile network 40: Tunnel Management (TM) Function; Mobile Routing (MR) Function; Address Configuration (AC) Function; and Handover Helper (HH) Function. Each of these four functionalities is briefly discussed below, as are interactions among the functionalities. Any one or more of these functions can be performed by corresponding units, and such units can be a processor or controller as those terms are expansively explained above. Moreover, one or more units (e.g., processors or controllers) can execute or perform one or more functions at a node.

The tunnel management (TM) Function is the entity responsible for establishment, shutdown, and re-routing of a P2MP tunnel 42. The tunnel management (TM) Function provides interfaces to the network management system and to the human operator. Tunnel management is a function carried out (e.g., implemented, executed, or performed) by the mobility aware routers (MARs) 44.

The Mobile Routing (MR) Function is the entity responsible for tracking the mobile node 30s' actual point of attachment and for interacting with the mobility aware router's (MARs) 44 forwarding engine in order to route traffic to the mobile nodes' correct location. The Mobile Routing (MR) Function is a function carried (e.g., implemented, executed, or performed) by mobility aware routers (MARs) 44.

The Address Configuration (AC) Function is the entity responsible for supplying Layer 3 (L3) addresses to a mobile node 30 when the mobile node 30 connects or reconnects to access network 22. Address configuration (e.g., Address Configuration (AC) Function) is a function carried out (e.g., implemented, executed, or performed) cooperatively by mobility aware routers (MARs) 44 and a mobile node 30.

The Handover Helper (HH) Function is the entity responsible for facilitating the handover process with functions including Layer 2 (L2) notification (triggering), L2 re-association, secure node attachment, and handover-related signaling. The Handover Helper (HH) Function can be spread among mobility aware routers (MARs) 44, network equipments (e.g., wireless switches), and the mobile node 30.

Functionality Interaction

The interactions among the four Functions, e.g., Tunnel Management (TM) Function, Mobile Routing (MR) Function, Address Configuration (AC) Function, and Handover Helper (HH) Function are identified below and illustrated in FIG. 2.

In a TM-MR interaction, depicted by example interaction 50 in FIG. 2, a Tunnel Management (TM) Function notifies the Mobile Routing (MR) Function when a tunnel is created, destroyed, or re-routed.

In a HH/AC-MR interaction, depicted by example interaction 51 in FIG. 2, when a Handover Helper (HH) Function or an Address Configuration (AC) Function detects a handover (before, during, or after its completion), the Mobile Routing (MR) Function is notified in order to trigger the location updating process for the migrating mobile node.

In a HH-AC interaction, depicted by example interaction 52 in FIG. 2, Handover Helper (HH) Function, upon detecting a handover, notifies the Address Configuration (AC) Function in order to trigger the address configuration procedure.

In a MR-MR interaction, depicted by example interaction 53 in FIG. 2, the Mobile Routing (MR) Function at different mobility aware routers (MARs) 44 cooperates through a Mobile Routing Protocol (MRP).

In a TM-TM interaction, depicted by example interaction 54 in FIG. 2, the Tunnel Management (TM) Functionalities at different mobility aware routers cooperate through a Tunnel Management Protocol (TMP).

In an AC-AC interaction, depicted by example interaction 55 in FIG. 2, the Address Configuration (AC) Function at the network side interacts with the Address Configuration (AC) Function at the mobile node side through an Address Configuration Protocol (ACP).

In a HH-HH interaction, depicted by example interaction 56 in FIG. 2, if Handover Helper (HH) Functions are spread among different elements of the architecture, they interact through a Handover Signaling Protocol (HSP).

Except for the HH-AC interaction (such as example interaction 52 in FIG. 2) that takes place on mobile nodes, the remaining interactions take place, at least in part, on mobility aware routers (MARs) 44. The algorithms and protocols necessary to support the functions and interactions above define a "Mobility Plane". A mobility plane aggregates management and control functions for supporting mobility in IP networks. Thus, FIG. 2 illustrates the interactions within a Mobility Plane.

In an example implementation, architecture implementing a mobility plane fulfills a set of primary and secondary requirements. The primary requirements are:

Support for both IPv4 and IPv6 protocols.
No changes on IP stack protocols on mobile nodes.
Coexistence among the IP mobility service and other existing or future services, e.g., MIPv6, VPN (Virtual Private Network), and VoIP (Voice over IP).
Secure node attachment and handover.

The main secondary requirements are:
Multiple tunneling schemes (e.g., MPLS, IP/IP)
Support for quality and/or class of service.
Support for Traffic Engineering (TE) functions.
Mobility Aware Routers (MARs)

As indicated above, a mobility aware router (MAR) 44 can be classified as either an ingress mobility aware router (MAR) 44I, a branch mobility aware router (MAR) 44B, or an egress mobility aware router (MAR) 44E.

Figure 3A:
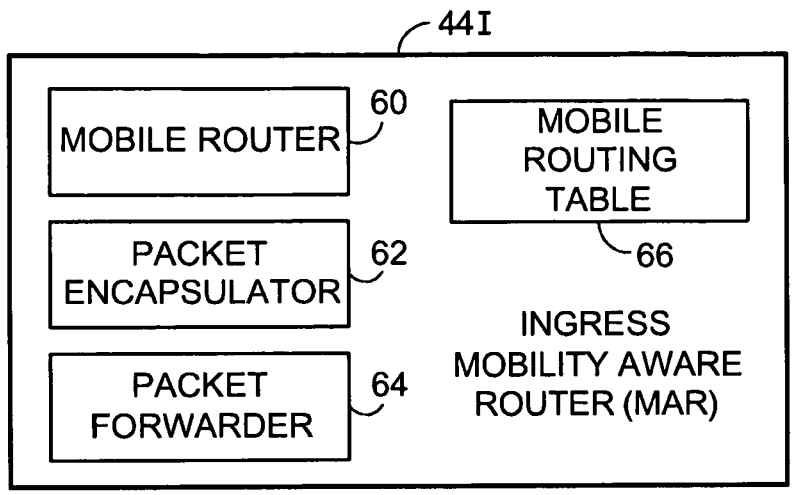
FIG. 3A is a diagrammatic view of selected functionalities of an example ingress mobility aware router (MAR).

FIG. 3A schematically shows representative, example constituent elements of an ingress mobility aware router (MAR) 44I. In particular, ingress mobility aware router (MAR) 44I comprises Mobile Routing Functionality 60 (also known as Mobile Router); Tunneling (encapsulation) Functionality 62 (also known as Packet Encapsulator); and Forwarding Functionality 64 (also known as Packet Forwarder).

As shown in FIG. 3A, an ingress mobility aware router (MAR) 44I performs, e.g., the functions of Mobile Routing; Tunneling (encapsulation); and Forwarding. These functions are shown as respective functionalities Mobile Routing is performed by Mobile Routing Functionality 60. When the ingress mobility aware router (MAR) 44I receives a packet targeted to mobile node 30, it must consult a mobile routing table 66 in order to choose a proper tunnel segment through which the packet will be forwarded. Entries on the mobile routing table 66 at ingress mobility aware router (MAR) 44I contain an address prefix as table index, the tunnel segment identifier, and tunneling information (e.g., type of service).

Tunneling (encapsulation) is performed by Tunneling (encapsulation) Functionality, e.g., Packet Encapsulator 62. The packet is encapsulated according to the tunneling information obtained from the mobile routing table. Typical encapsulation actions consist of adding an outer header to the packet or to label the packet.

Packet forwarding is performed by Packet Forwarding Functionality, e.g., Packet Forwarder 64. Once encapsulated, the packet is forwarded through the chosen tunnel segment.

Branch Mobility Aware Routers (MARs)

Figure 3B:
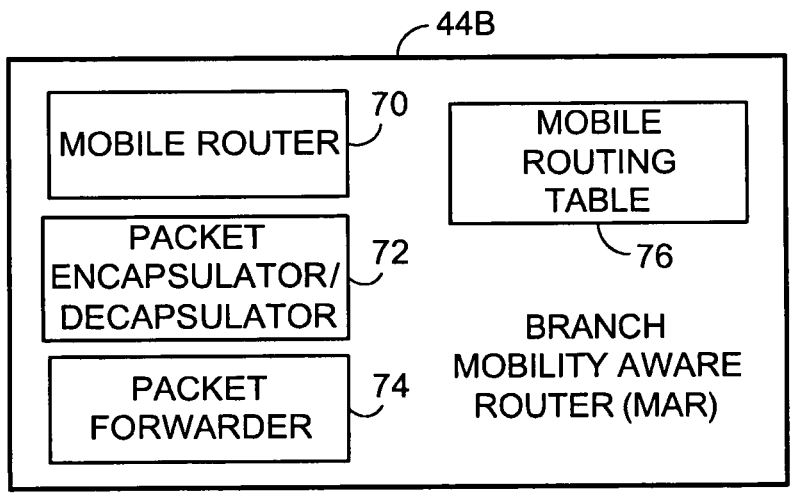
FIG. 3B is a diagrammatic view of selected functionalities of an example branch mobility aware router (MAR).

FIG. 3B schematically shows representative, example constituent elements of a branch mobility aware router (MAR) 44B. In particular, branch mobility aware router (MAR) 44B comprises Mobile Routing Functionality 70 (also known as Mobile Router); Tunneling (encapsulation/decapsulation) Functionality 72 (also known as Packet Encapsulator/Decapsulator); and Forwarding Functionality 74 (also known as Packet Forwarder).

Mobile Routing by branch mobility aware router (MAR) 44B is performed by Mobile Routing Functionality 70. When a branch mobility aware router (MAR) 44B receives a tunneled packet, it performs a decapsulation operation in order to recover the inner packet header or label. Decapsulation is performed by the Packet Encapsulation/Decapsulation Functionality (Encapsulator/Decapsulator) 72. The mobility aware router then consults mobile routing table 76 in order to decide through which branch the original packet will be forwarded. Entries on the mobile routing table 76 at branch MARs contain an identifier of the mobile node as table index, the identifier of the next tunnel segment, and tunneling information.

Tunneling (encapsulation) is performed by Tunneling (encapsulation) Functionality, e.g., Packet Encapsulator 72. The original packet is encapsulated according to the tunneling information obtained from the mobile routing table 76. Typical encapsulation actions comprise adding an outer header to the packet or to label the packet.

Packet forwarding is performed by Packet Forwarding Functionality, e.g., Packet Forwarder 74. Once encapsulated, the packet is forwarded through the chosen tunnel segment.

Egress Mobility Aware Routers (MARs)

Figure 3C:
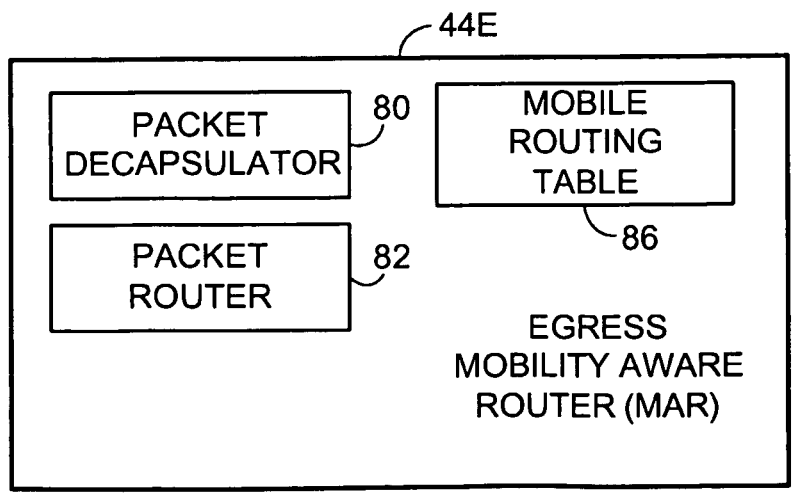
FIG. 3C is a diagrammatic view of selected functionalities of an example egress mobility aware router (MAR).

FIG. 3C schematically shows representative, example constituent elements of a egress mobility aware router (MAR) 44E. In particular, egress mobility aware router (MAR) 44E comprises Packet Decapsulation Functionality 80 (also known as Packet Decapsulator) and Packet Routing Functionality (also known as Packet Router) 82.

Decapsulation is performed by Packet Decapsulation Functionality (Packet Decapsulator) 80. In Packet Decapsulation Functionality 80, the tunneled packet is decapsulated (e.g., by stripping its outer header) and the tunneled packet recovered.

Packet Routing Functionality (Packet Router) 82 routes the tunneled packet via regular IP routing toward its destination (mobile node 30). IP routing is assisted by mobile routing table 86.

Throughout its handling by the functionalities of ingress mobility aware router (MAR) 44I, branch mobility aware router (MAR) 44B, and egress mobility aware router (MAR) 44E, the original packet remains unchanged while being tunneled through the segments of P2MP tunnel 42.

Policies

In the architecture different policies can be applied to guide the routing and mobility process. Policies are rules that are used if several alternatives are possible and optimization can be done. The selection of anchor-point is done when the mobile node for the first time is attaching to the network to select the top-node in the tree. Example policies are or affect such things as Max number of simultaneous sessions: A parameter that limits the number of simultaneous sessions in a router. If the maximum number is achieved, another anchor-point can be selected.

Terminal type/subscription type: if the type of terminal can be retrieved for a subscription server (i.e. Radius), different anchor-points can be selected based on the subscription type.

Operation Overview

When a packet targeted to a mobile node reaches an ingress mobility aware router (MAR) 44I, it is tunneled according to the functions stated above until it reaches an egress mobility aware router (MAR) 44E able to route the packet to the mobile node 30.

Figure 4:
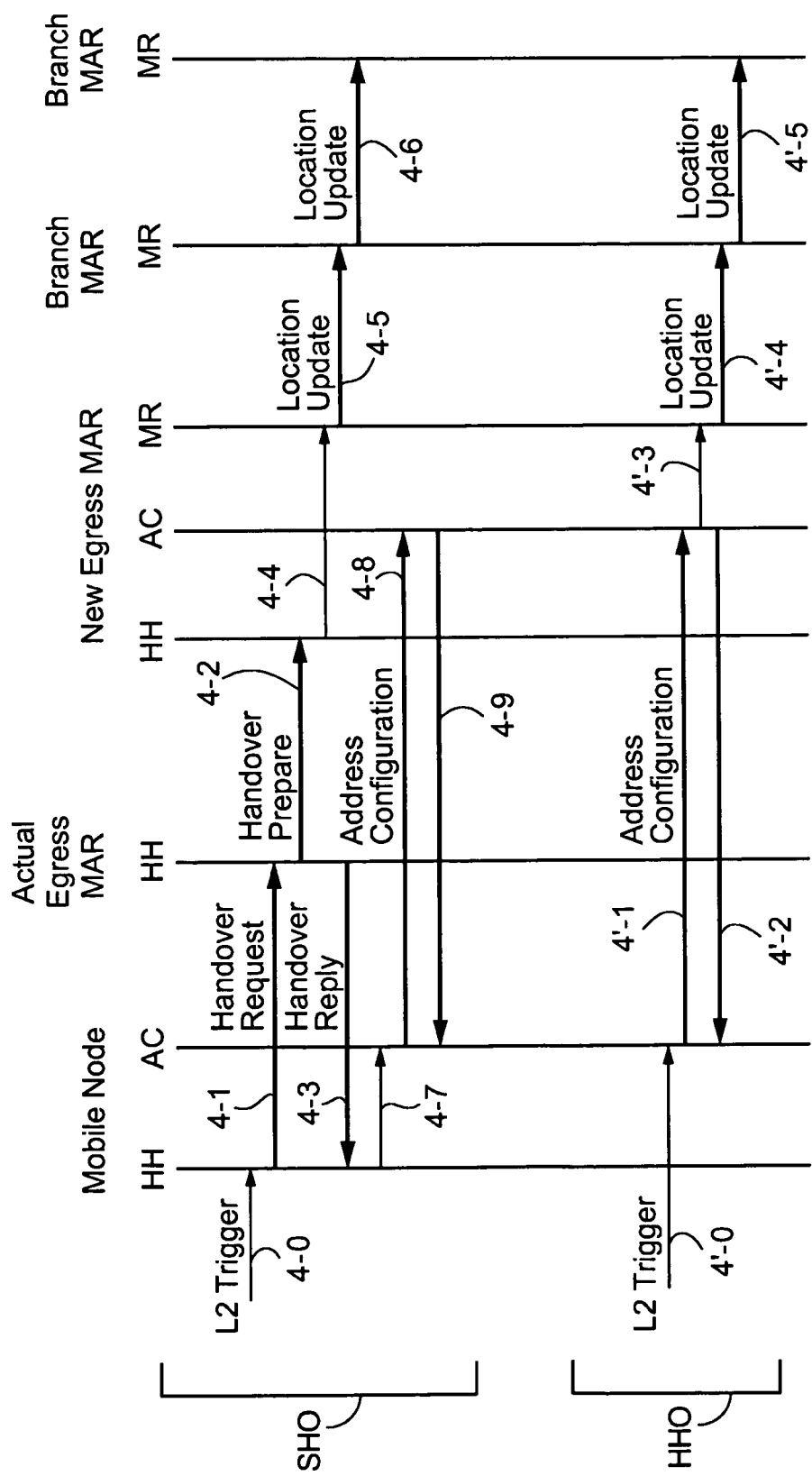
FIG. 4 is a diagrammatic view illustrating example, representative acts including signaling involved in operation of an example overlay mobile network, the operation including a soft (anticipated) and a hard (non-anticipated) handover operations.

FIG. 4 illustrates example, representative acts including signaling involved in operation of an example overlay mobile network. FIG. 4 shows by bracket SHO the example acts involved in a soft (make-before-break) handover operation, and shows by bracket HHO the example acts involved in a hard (break-before-make) handover operation.

Act 4-0 of FIG. 4 shows a L2 trigger which prompts the soft (anticipated) handover (SHO) operation. Act 4-1 of FIG. 4 shows the Handover Helper (HH) Function of mobile node 30 sending a handover request message to Handover Helper (HH) Function of its existing (actual) egress mobility aware router (MAR) 44E before L2 handover starts. Act 4-2 is a handover prepare message sent from Handover Helper (HH) Function of the existing or actual egress mobility aware router (MAR) 44E to the new or target egress mobility aware router (MAR) 44E. Act 4-3 is a handover reply message sent from the Handover Helper (HH) Function of the existing egress mobility aware router (MAR) 44E to the Handover Helper (HH) Function of mobile node 30. Act 4-4 shows a HH-MR interaction wherein the Mobile Routing (MR) Function of the new egress mobility aware router (MAR) 44E is notified in order to trigger the location updating process for the migrating mobile node. Act 4-5 and act 4-6 show MR-MR interactions wherein the location update is performed for two branch mobility aware routers (MAR) 44B up the tree for P2MP tunnel 42. Act 4-7 is an HH-AC interaction wherein the Handover Helper (HH) Function of mobile node 30 notifies, after L2 handover completes, the Address Configuration (AC)

Function of mobile node 30 in order to trigger the address configuration procedure. Act 4-8 and act 4-9 are involved in the address configuration procedure. As act 4-8 the Address Configuration (AC) Function of mobile node 30 sends an address configuration message to Address Configuration (AC) Function of the new egress mobility aware router (MAR) 44E. Act 4-9 shows an address configuration reply message sent from Address Configuration (AC) Function of the new egress mobility aware router (MAR) 44E to the Address Configuration (AC) Function of mobile node 30.

Thus, when the mobile node 30 performs a handover SHO (according to procedures dictated by its Handover Helper (HH) Function), the Address Configuration (AC) Functions that are present on the mobile node 30 and on egress mobility aware router (MAR) 44E interact in order to provide the mobile node with a new Layer 3 (L3) address. If the address is identical to the previous one, the transport connections are not broken due to the handover. The handover also triggers a mobile node location updating on the Mobile Routing (MR) Function (depicted by act 4-5 and act 4-6). The location updating process updates the mobile routing tables (66, 76 86) on the mobility aware routers (MARs) 44 in such a way that, when a packet is targeted to the mobile node, the packet is routed to the egress MAR serving the link the mobile node is attached to.

FIG. 4 also shows example, representative acts including signaling involved in a hard (non-anticipated) handover (HHO) operation. Act 4'-0 of FIG. 4 shows a L2 trigger which prompts the handover (HO) operation after L2 handover has been completed. Act 4'-1 and act 4'-2 are involved in the address configuration procedure. As act 4'-1 the Address Configuration (AC) Function of mobile node 30 sends an address configuration message to Address Configuration (AC) Function of the new egress mobility aware router (MAR) 44E. Act 4'-2 shows an address configuration reply message sent from Address Configuration (AC) Function of the new egress mobility aware router (MAR) 44E to the Address Configuration (AC) Function of mobile node 30. Further, the address configuration procedure causes the Address Configuration (AC) Function of the new egress mobility aware router (MAR) 44E to perform an AC-MR interaction (as act 4'-3) with its Mobile Routing (MR) Function. As a result of the AC-MR interaction, the Mobile Routing (MR) Function of the new egress mobility aware router (MAR) 44E is notified in order to trigger the location updating process for the migrating mobile node. Act 4'-4 and act 4'-5 of FIG. 4 reflect the location update procedure.

Figure 5:
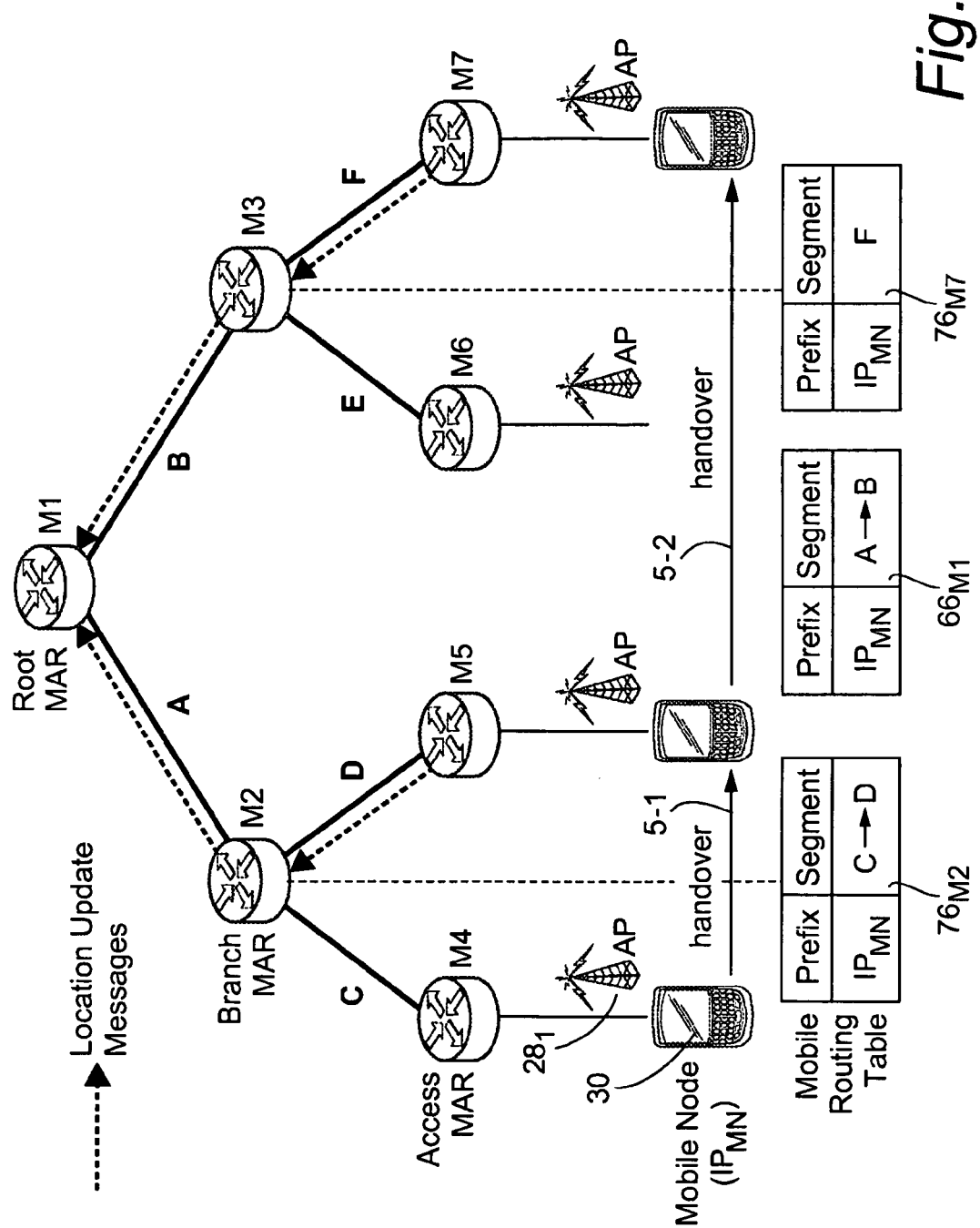
FIG. 5 is a diagrammatic view illustrating a mobile routing process an example location update messages for an example overlay mobile network.

An example mode of mobile routing and an example location update process is described with reference to FIG. 5. FIG. 5 shows ingress (or root) mobility aware router M1; two branch mobility aware routers M2 and M3; and four egress (access) mobility aware routers M4, M5, M6, and M7. In the tunnel of the mobility plane of the overlay mobile network of FIG. 5, egress mobility aware router M4 and egress mobility aware router M5 are connected to branch mobility aware router M2 by tunnel segments C and D, respectively. Egress mobility aware router M6 and egress mobility aware router M7 are connected to branch mobility aware router M3 by tunnel segments E and F, respectively. Branch mobility aware router M2 and branch mobility aware router M3 are connected to ingress (or root) mobility aware router M1 by tunnel segments A and B, respectively.

FIG. 5 shows mobile node 30 attached via egress mobility aware router M4. When mobile node 30 moves (as depicted by arrow 5-1) to a link served by egress mobility aware router M5, the entry related to this node on the mobile routing table $76_{M2}$ at branch mobility aware router M2 must be updated with a different tunnel segment (in this case from tunnel segment C to tunnel segment D). If, as shown by arrow 5-2 in FIG. 5, mobile node 30 roams further to a link served by egress mobility aware router M7, the mobile routing table $66_{M1}$ at ingress mobility aware router M1 and the mobile routing table $76_{M3}$ at branch mobility aware router M3 must be updated. Table updates are performed as soon as the mobile routing protocol messages indicating the new point of attachment are processed by the branch mobility aware routers (MARs), e.g., after processing of location update 4-6 at the new branch mobility aware router and location update 4-5 at the old branch mobility aware router (see FIG. 4).

The entries on the mobile routing tables of the mobility aware routers are soft state, meaning that the entries are dropped if location update messages confirming them cease. Soft state is a clear way to drop routes to mobile nodes when they no longer are reached through these routes. This scheme demands that mobile node 30 perform network attachments periodically in order to generate location update messages that will refresh the routes to it. A way to force mobile node 30 to perform periodic network attachments is to provide mobile node 30 with L3 addresses with short lease time. When the lease time is close to expire, mobile node 30 performs network attachment that will generate address location update messages on its behalf.

Protocols

The Tunnel Management (TM) Function, the Mobile Routing (MR) Function, the Address Configuration (AC) Function, and the Handover Helper (HH) Function interact through networking protocols. These protocols are illustrated for sake of simplicity as circles superimposed on arrows in FIG. 2. Ideally, the protocols are those which are already well established, but which eventually may have minor and allowed extensions.

The Tunnel Management Protocol allows point to multipoint (P2MP) tunneling establishment on IP networks. The RSVP-TE protocol with recent point to multipoint (P2MP) extensions can be such a protocol. In this regard, see one or more of: D. Awduche et al, RSVP-TE: Extensions to RSVP for LSP Tunnels, RFC 3209, December 2001; S. Yasukawa, Signaling Requirements for Point-to-Multipoint Traffic-Engineered MPLS Label Switch Paths (LSPs), RFC 4461, April 2006, and R. Aggarwal et al, Extensions to RSVP-TE for Point-to-Multipoint TE LSPs, Internet Draft (draft-ietf-mpls-rsvp-te-p2 mp-06.txt), July 2006. Alternatively, proprietary protocols based on CLI (Command Line Interface), SNMP (Simple Network Management Protocol), or HTTP (Hypertext Transfer Protocol) can be employed as well.

The Mobile Routing Protocol differs from the regular Internet Protocol routing protocol on the transport network in the sense that it is circumscribed to the overlay network. One possibility is to piggyback mobile node locations on the regular IP protocols, for instance, in OSPF (Open Shortest Path First) opaque LSA (Link State Advertisement). This solution is limited to a network with few mobile nodes since it demands LSA flooding at every mobile node handover.

Another possibility is to piggyback mobile node locations on the Tunnel Management Protocol. In case of RSVP-TE, Reservation (RESV) messages can carry an opaque object with a mobile node location (the Mobile Node Location Object). This solution scales better than the previous one since no flooding is necessary and the RESV message is processed only by those mobility aware routers (MARs) that need to update or install routes to the mobile nodes identified in the opaque object.

Address configuration can be stateless or statefull. With statefull address configuration it is possible to keep the previous L3 address during a handover in order to preserve the transport connections. DHCP (Dynamic Host Configuration Protocol) can be employed as address configuration protocol. Regarding DHCP, see, e.g., R. Droms, Dynamic Host Configuration Protocol, RFC 2131, March 1997; and R. Droms, Dynamic Host Configuration Protocol for IPv6, RFC 3315, July 2003. In this case, each access router has a DHCP proxy to a DHCP server. DHCP is configured to allocate addresses with short lease time in order to force the mobile nodes to perform network attachement periodically. Network attachement triggers location update messages confirming the actual mobile node's point of attachment in the access network.

RFC 4068 (Fast Handovers for Mobile IPv6) establishes an L3 handover protocol for IPv6 networks supporting MIPv6. Although there is no counterpart of this protocol for IPv4 networks, it is easy to adapt it for IPv4 networks.

Another possibility is to employ L2 triggers able to signal L2 handover activities to the upper layers. Finally, proprietary protocols can be employed as well.

Mobile Routing

Point-to-multipoint (P2MP) tunnels were designed for multicasting distribution trees. As such, a packet being tunneled is replicated at each forking point in the tree. A mobility aware router (MAR) 44 employing P2MP tunnels for routing traffic to mobile nodes must change this behavior in order to avoid packet replication if it knows the tunnel segment from which the mobile node is reached. In order to know the exact location of mobile nodes, branch mobility aware routers (MARs) 44B must keep per node routes to mobile nodes. As such, the mobile routing tables 76 at the branch mobility aware routers (MARs) 44B contain full address entries for the mobile nodes in addition to the aggregated entries for the networks announced by the routing protocols at the transport network.

Since full length prefix routes compromises scalability, aggregation solutions is desired. Route aggregation for mobile nodes can be achieved via Topological constraints; Aggregated mobility; and/or Network mobility. A route aggregation based on topological constraints mode of operation is described subsequently.

The access network is divided into regions with disjoint address ranges and fixed routes are installed on each mobility aware router (MAR) 44 for each region. A mobile node attached to a region with address in the region's range needs no individual route (the route assigned to the region suffices to reach the mobile node).

A continuous L3 address range is assigned to a "moving container" (e.g., a train) and every mobile node in the container receives an address within this range. Location updating and mobile routing are performed for the whole range.

A moving router is in fact a moving node with several mobile nodes attached to it. The router hides the mobile nodes from the mobile network.

Example Implementation Modes

An example mode of implementation uses only the client side of the Dynamic Host Configuration Protocol (DHCP) on mobile nodes. It assumes that when a layer 2 (L2) handover takes place the mobile node renews its layer 3 (L3) address by issuing a DHCP Request or Renew message (e.g., network attachment). More enhanced implementations may employ handover helpers fitted with L2 triggers and handover signaling functions. Handover helpers can be installed on mobile nodes at user space, device driver, or operating system kernel levels.

At the network side, the implementation employs the same L3 prefix for the whole access network. The implementation can be deployed on IPv6 or IPv4 networks. The mobility plane employs the protocols and extensions as defined in the sequence.

Figures 6, 7:
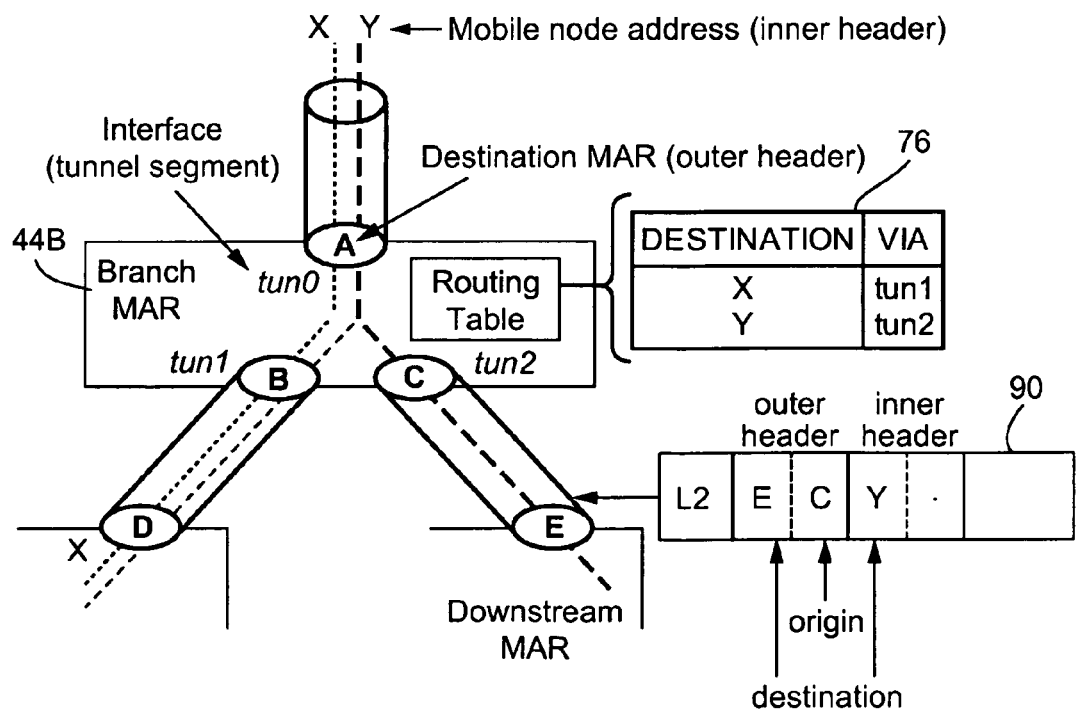
FIG. 6 is a diagrammatic view of an opaque object "Mobile Node Location Object" which facilitates mobility routing.
FIG. 7 is a diagrammatic view of an example implementation of an IP/IP tunneling scheme.

RSVP-TE with P2MP extensions is employed for both tunneling management and mobility routing. For mobility routing, an opaque object named the Mobile Node Location Object is illustrated in FIG. 6. RSVP-TE with P2MP extensions is understood from, e.g., R. Aggarwal et al, Extensions to RSVP-TE for Point-to-Multipoint TE LSPs, Internet Draft (draft-ietf-mpls-rsvp-te-p2 mp-06.txt), July 2006.

As shown in FIG. 6, Mobile Node Location Object carries the mobile node ID (e.g., the Medium Access Control [MAC] address of its aerial interface); the mobile node's L3 address type (IPv4 or IPv6); mobile node prefix length; and mobile node prefix; the identifier of the egress mobility aware router (MAR) 44 serving the mobile node's current link; and, a set of flags. The use of a mobile node prefix instead of full addresses allows a single object to refer to a set of mobile nodes in case of aggregated mobility. A RESV message carrying such object is generated at the egress mobility aware router (MAR) 44E as soon as this egress mobility aware router (MAR) 44E learns about the node attachment. This RESV message travels the tunnel upstream towards the ingress mobility aware router (MAR) 44I. The processing of this message causes the updating of the mobility aware router's/routers' mobile routing table.

DHCPv4 and DHCPv6

Dynamic Host Configuration Protocol (DHCP) is employed for statefull address configuration. Each egress mobility aware router (MAR) 44E is fitted with a DHCP proxy agent in such a way that this proxy answers DHCP requests on the link and forwards to a DHCP server. On IPv4 networks, DHCPv4 replies supply the mobile node with the network prefix and default router. A default router is a router to which a host or another router forwards packets if it doesn't know an other next hop. On IPv6 networks, this information must be acquired from the Network Discovery (ND) Router Advertisement messages.

RSVP-TE RESV messages carrying Mobile Node Location Objects are generated when a mobile node performs address requests or network attachments to the DHCP proxy serving the link. The return of messages from the DHCP proxy are intercepted at the egress mobility aware router (MAR) 44E before being forwarded to the mobile node. The interceptor code interacts with the RSVP-TE daemon supplying it the mobile node ID, its assigned L3 address data, and the proper flags. The daemon generates the location update message and forwards it to the upstream mobility aware router (MAR) 44, e.g., which can be both ingress mobility aware router (MAR) 44I and branch aware router (MAR) 44B because, in the longest case, the message goes upstream up to the root".

IP/IP tunneling can use the Generic Routing Encapsulation (GRE). Generic Routing Encapsulation is described, e.g., by D Farinacci et al, Generic Routing Encapsulation (GRE), RFC 2784, March 2000. GRE supports IPv4 over IPv4 or IPv6, and IPv6 over IPv6 or IPv4.

With GRE tunnels the access network and the transport network can employ different versions of the IP protocol. GRE tunnel segments are established by RSVP-TE messages. PATH messages establish the tunnel endpoint at the downstream mobility aware routers (MAR) 44 while RESV messages establish the endpoint at the upstream mobility aware routers (MAR) 44.

FIG. 7 illustrates an example implementation of an IP/IP tunneling scheme. FIG. 7 particularly shows, e.g., a branch mobility aware router (MAR) 44B and its routing table 76. An IP/IP tunnel segment is represented by a virtual interface (e.g., tunnel tun0). In fact, the branch mobility aware router (MAR) 44B is connected by tunnel segment tun0 to an unillustrated upstream mobility aware router (MAR) 44, by tunnel segment tun1 to a first downstream mobility aware router (MAR) 44, and by tunnel segment tun2 to a second downstream mobility aware router (MAR). Port A of branch mobility aware router (MAR) 44B is connected to tunnel tun0; port B of branch mobility aware router (MAR) 44B is connected to tunnel tun 1; and port C of branch mobility aware router (MAR) 44B is connected to tunnel tun2. FIG. 7 further shows an inner tunnel X (extending through tunnels tun0 and tun1) and an inner tunnel Y (extending through tunnels tun0 and tun2). In FIG. 7, inner tunnel X is actually presently involved in communications with a specific mobile node of interest. Inner tunnel Y, on the other hand, is representative of, e.g., the fact that other inner tunnels exist which are utilized (at least at the present time) for communication with other mobile nodes. The inner tunnel X corresponds to a mobile node address or location of the specific mobile node of interest, the inner tunnel Y corresponds to the mobile node address or location of a representative other mobile node.

Entries on the routing table 76 of FIG. 7 (shown in expanded version to the right of branch mobility aware router (MAR) 44B) serve to map prefixes of mobile nodes to virtual interfaces (e.g., to tunnels). Routing table 76 is configured to provide a next hop for a destination prefix. For example, the routing table 76 in FIG. 7 shows that for the packets received on inner tunnel X the next hop is tunnel tun1.

The advantage of IP/IP tunneling is that the routing and forwarding for mobile traffic do not differ from the regular IP routing and forwarding. More precisely, the mobile routing table is integrated with the already existing routing table and the forwarding engine of the mobility aware router (MAR) remains unchanged. As understood by those skilled in the art, a packet forwarding engine is an entity which provides Layer 2 and Layer 3 packet switching, route lookups, packet forwarding, and route lookup functions.

Thus far the terms "Mobile Routing Table" and "Routing Table" have been used generically to describe a routing table for any mobility aware router (MAR) 44. Depending on the type of mobility aware router (MAR), the routing table can have a more specific name. For example, the mobile routing tables for MPLS tunneling are also known as the FEC (Forward Equivalent Class) tables on ingress MARs 44I and as the Label Information Bases (LIBs) on branch mobility aware routers (MAR) 44B. RESV messages install entries on both FEC tables and Label Information Bases on the respective types of mobility aware routers (MAR) 44.

FIG. 7 further illustrates how Multiprotocol Label Switching (MPLS) tunneling employs label stacking to tunnel packets to mobile nodes. FIG. 7 shows an example MPLS packet 90. The example MPLS packet 90 includes one or more headers, such as an outer header and an inner header. The inner header corresponds to the mobile node address or location; the outer header includes a destination field and an origin field for the tunnel. For example, for the MPLS packet 90 shown in FIG. 7, the inner header identifies Y as the address of the mobile node involved in the communication (and using inner tunnel Y) and the outer header identifies port C in the origin field and port E in the destination field. Thus, the outer label identifies the tunnel segment while an inner label identifies the mobile node.

Figure 8:
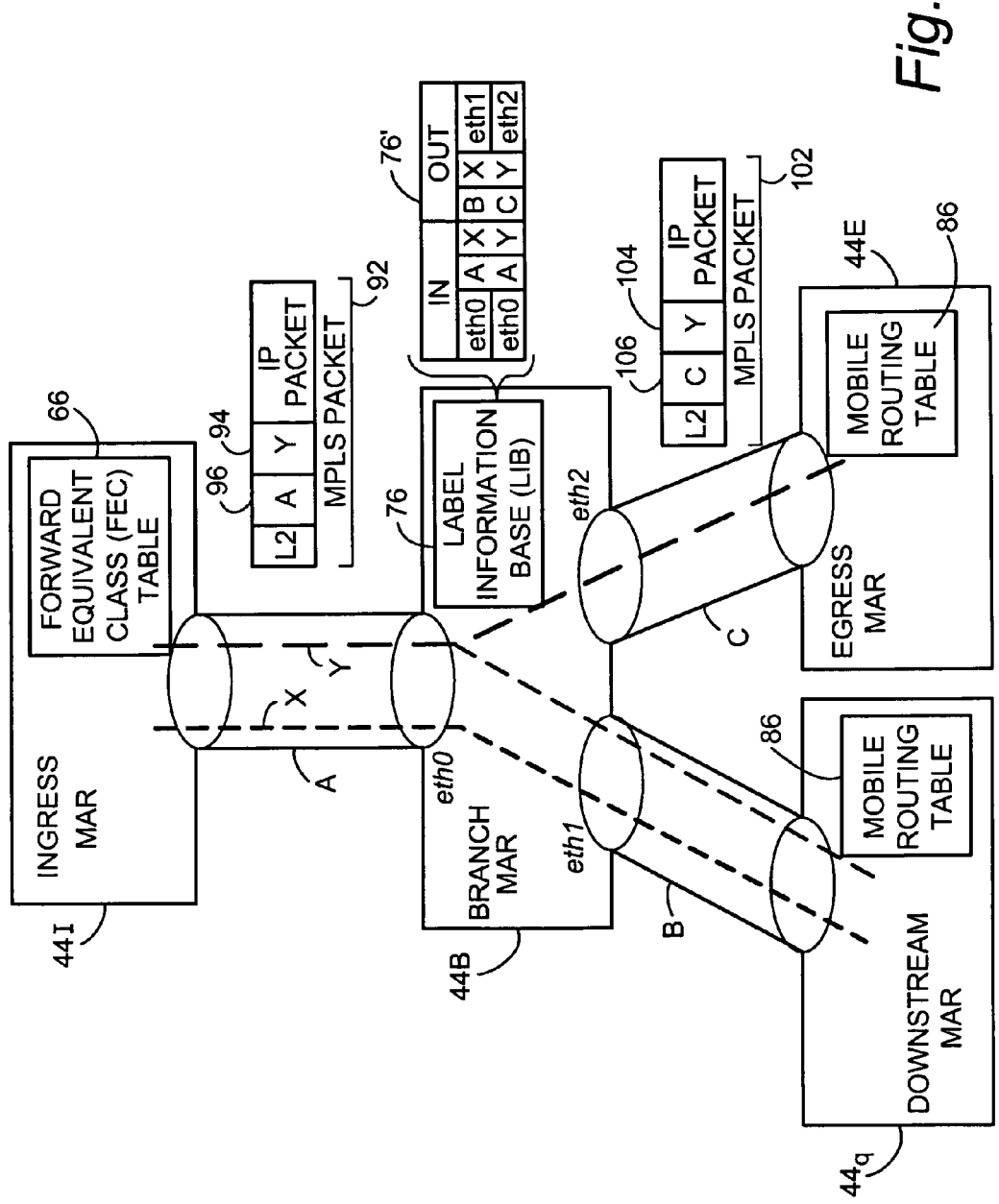
FIG. 8 is a diagrammatic view of an example implementation of a MPLS tunneling scheme

FIG. 8 illustrates an example implementation of a MPLS tunneling scheme. FIG. 8 shows an ingress mobility aware router (MAR) 44I connected by tunnel segment A to branch mobility aware router (MAR) 44B. The branch mobility aware router (MAR) 44B is connected by two separate tunnel segments B and C to mobility aware routers (MAR) 44q and 44E, respectively. The mobility aware router (MAR) 44q can be either a further branch mobility aware router or an egress mobility aware router. It so happens that the mobility aware router (MAR) 44E is an egress mobility aware router. The branch mobility aware router (MAR) 44B has port eth0 connected to tunnel A; port eth1 connected to tunnel B; and port eth2 connected to tunnel C. FIG. 8 further shows an inner tunnel X which corresponds to a location of a first mobile node (e.g., corresponds to a first mobile node location), and an inner tunnel Y which corresponds to a location of a second mobile node (e.g., corresponds to a second mobile node location)

On the ingress mobility aware router (MAR) 44I, a Forward Equivalent Class (FEC) table 66 with a full-length address prefix of the mobile node is installed. Aggregation schemes such as those specified below can be employed in order to avoid FECs with full-length address prefixes.

Under normal operation, when a packet destined for a specific mobile node arrives at the ingress mobility aware router (MAR) 44I, this mobility aware router (MAR) 44I performs a lookup for a match entry in its FEC table 66. If such a match is found, the two labels associated with or obtained from the FEC 66 are pushed into the MPLS packet 92. A first or inner label (label 94) corresponds to the mobile node location; a second or outer label (label 96) corresponds to the outgoing tunnel segment which is to be used.

The packet is switched based on the outer label 96 (identifying the P2MP tunnel trunk) until it reaches a branching point, such as branch mobility aware router (MAR) 44B. As shown in FIG. 8, branch mobility aware router (MAR) 44B comprises Label Information Base (LIB) 76 which stores both possible outer and inner labels for connections received at its incoming port (port eth0) and possible outer and inner labels for connections outgoing on outgoing ports (port eth1 and port eth2). FIG. 8 shows example contents 76' of Label Information Base (LIB) 76, which indicates that packets for both mobile node locations X and Y enter via tunnel segment A at port eth0. The example contents 76' of Label Information Base (LIB) 76 also indicate that packets for mobile node location X exit through port eth1 to tunnel segment B and that packets for mobile node location Y exit through port eth2 to tunnel segment C. Based on the information stored at Label Information Base (LIB) 76, at branch mobility aware router (MAR) 44B, the label swapping is based on both labels (inner and outer). In other words, a MPLS packet 102 destined for mobile node location has an inner label 104 which specifies mobile node location Y and an outer label 106 which specifies tunnel segment C.

When the packet reaches egress mobility aware router (MAR) 44E, the labels are stripped and the packet is subjected to regular IP routing towards its destination.

Figure 9:
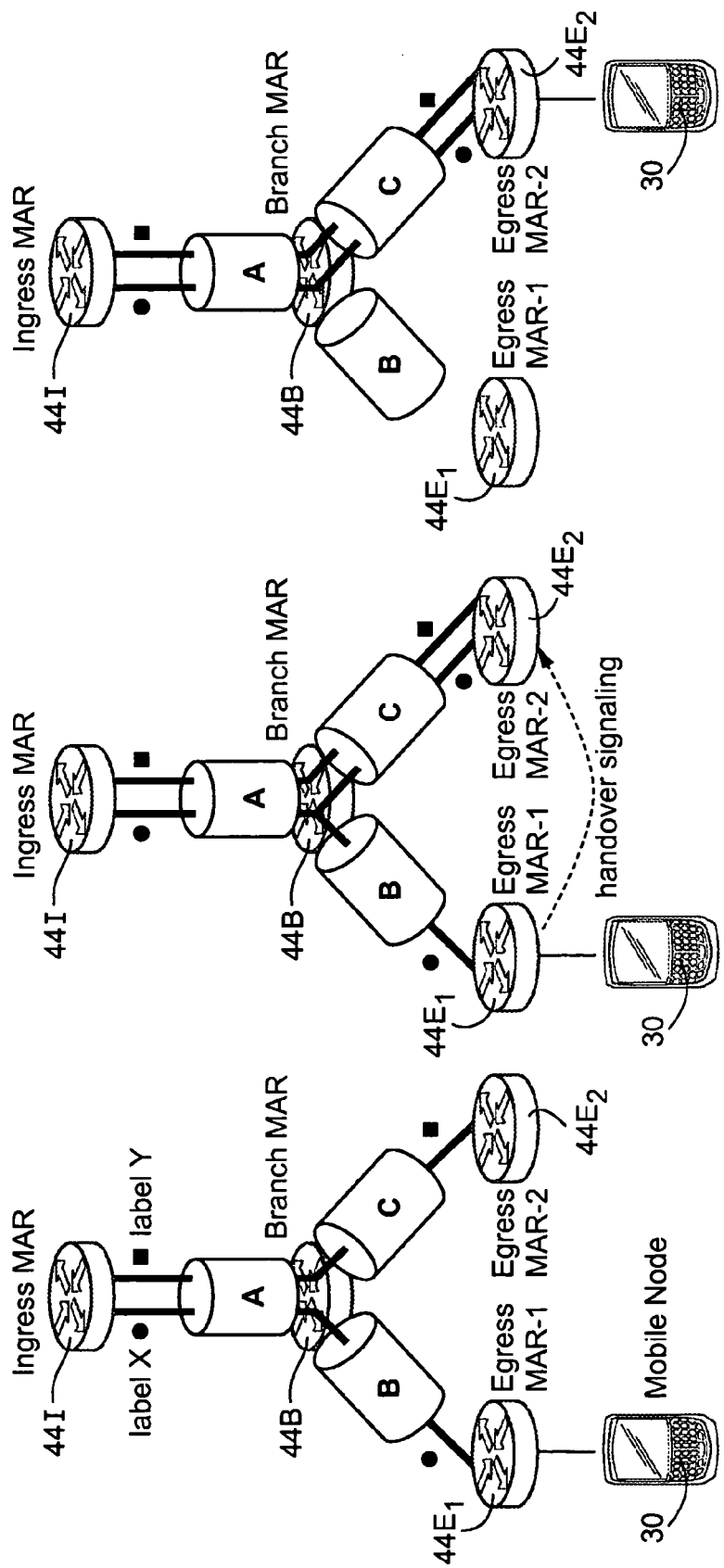
FIG. 9A, FIG. 9B, and FIG. 9C are diagrammatic views illustrating how an inner tunnel segment must be managed when the mobile node migrates from one egress mobility aware router to another egress mobility aware router.

FIG. 9A, FIG. 9B, and FIG. 9C illustrate how, in this example, an inner tunnel segment X is managed when the mobile node migrates from egress MAR-1 ($44E_1$) to egress MAR-2 ($44E_2$). FIG. 9A shows the mobile node being reached via egress MAR-1 ($44_1$) through inner segment X and outer segments A and B. During mobile node migration, the RSVP-TE RESV message with a mobile node location object creates an inner tunnel segment X within outer segment C and encloses the inner segment X within outer segment B. If this message is signaled in advance, inner segment X may coexist on both outer segments B and C. This situation is illustrated in FIG. 9B and is a case of bicasting where packets to the mobile node are forwarded to both segments B and C in order to minimize packet losses during handover. Bicasting lasts for a short period of time until the handover process completes. After the mobile node completes its handover, the inner segment X within outer segment B is dropped as shown in FIG. 9C.

A security mode of implementation may employ L2 authentication based on Remote Authentication Dial in User Service (RADIUS). Remote Authentication Dial in User Service is described, e.g., by C. Rigney, Remote Authentication Dial In User Service (RADIUS), RFC 2865, June 2000.

The mobile node 30 supplies its credentials (e.g., username/password, MAC address) when attaching to an access point (AP) 28. The access point authenticates the mobile node on a RADIUS server against the supplied credentials. If the authentication succeeds, the access point completes the attachment process. Public Key Infrastructure (PKI) can be employed in order to enhance security, but at an extra overhead in performance and configuration.

In a Class of Service Provisioning mode of implementation, class of service (CoS) is achieved via DSCP (DiffServ Code Point) for IP/IP tunnels or via the EXP (experimental) bits of the shim headers in case of MPLS tunnels. The class of service is decided when the mobile nodes attaches for the first time on the access network (e.g., based on its credentials). This information is propagated on the Mobile Node Location Object (Flag bits of FIG. 6). DSCP or EXP is marked on the ingress MAR while the remaining MARs simply honor these marks.

Another possibility for offering CoS is to provide multiple "parallel" P2MP tunnels, each one offering a certain level of CoS. The ingress MAR, based on the packet header (e.g., destination address), selects the proper tunnel to forward the packet towards the egress MAR.

In an example IP Addressing mode of implementation the access network 22 employs private addressing for security and operational reasons. Privacy and security are favored by assigning the mobile node a private address in such a way that the node is not visible from outside the network. Operational procedures are favored by employing a large address space (e.g., a class B address) on the mobile network, avoiding shortage of IP addresses when the number of mobile nodes increases. Private addressing demands NAT be configured on the ingress mobility aware router (MAR) 44I or anywhere in between the ingress mobility aware router (MAR) 44I and the backbone network 24. NAT must be activated on a powerful router since it may compromise performance as the number of mobile nodes increases.

Figure 10:
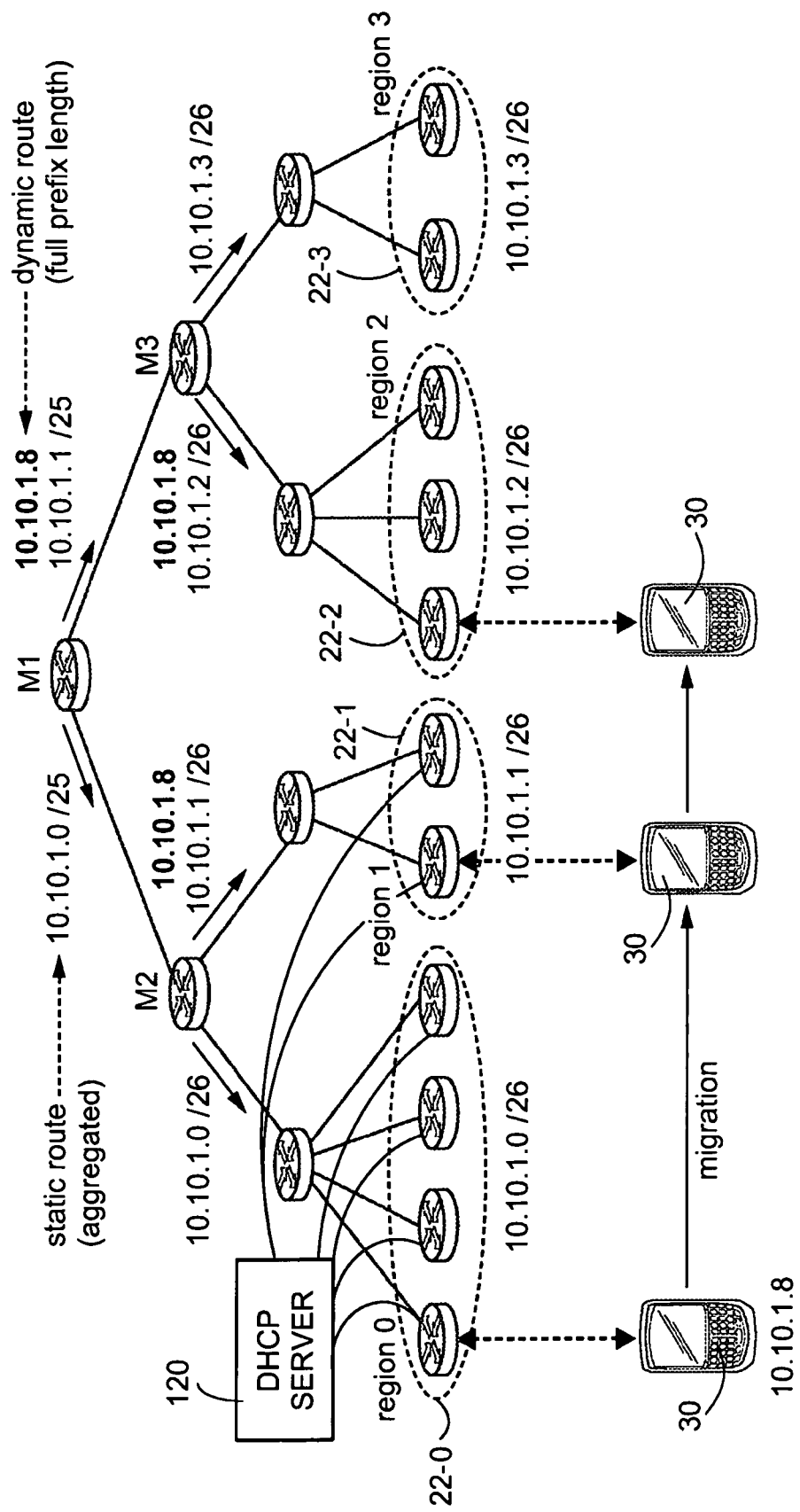
FIG. 10 is a diagrammatic view illustrating an example implementation of an address aggregation mode scheme via topological constraints.

A Route Aggregation mode of implementation employs address aggregation based on topological constraints. An example implementation of an address aggregation mode scheme is illustrated for a simple network in FIG. 10. In FIG. 10, access network 22 is divided into four regions: region 22-0, region 22-1, region 22-2, and region 22-3. FIG. 10 shows a DHPC server 120, to which each access router (e.g., each egress mobility aware router (MAR) 44E has a DHCP proxy. Although in FIG. 10 DHPC server 120 is shown for convenience as being connected to only some egress mobility aware routers (MAR) 44E, it should be understood that any and/or all egress mobility aware routers (MAR) 44E may be connected to DHPC server 120. The address space is divided into four intervals similar to address masking. Mobility aware routers are unaware of these intervals, but the DHCP server 120 is aware. Aggregated routes to these regions are installed statically on the mobility aware routers (MARs) 44. Nodes attaching for the first time to a region must receive an address within the interval (e.g., mobile node 30 of FIG. 10 receiving address 10.10.1.8). If the mobile node roams inside a region, no route updating is necessary since the static routes suffice to reach the mobile node at that region. But when a mobile node leaves a region, routes updating take place locally. For example, when the mobile node leaves region 22-0 and enters region 22-1, a route updating takes place solely on branch mobility aware router (MAR) M2 since the static route on ingress mobility aware router (MAR) M1 is still valid for reach the mobile node at region 22-1. When the mobile node 30 enters region 22-2, however, route updating takes place on ingress mobility aware router (MAR) M1 and branch mobility aware router (MAR) M2 and on branch mobility aware router (MAR) M3.

In a most straightforward case, an overlay mobile network 40 can have a single P2MP tunnel 42. Yet, there are certain network topologies that demand or lend themselves to multiple P2MP tunnels. An example is a transport network with multiple connections to the backbone. In this case, each router connected to the backbone may act as ingress mobility aware router (MAR) 44I, and thereby serve to root a P2MP tunnel. A possible problem with multiple P2MP tunnels occurs when an ingress mobility aware router (MAR) receives a packet targeted to a mobile node that is reached via a P2MP tunnel rooted on another mobility aware router (MAR).

Figure 11A:
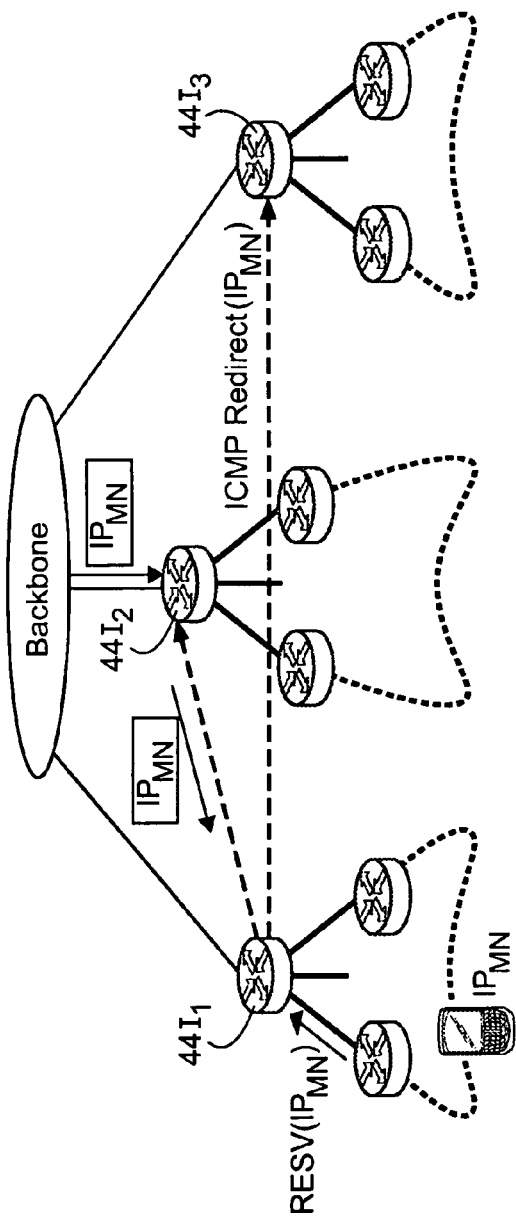
FIG. 11A and FIG. 11B illustrate overlay network with multiple P2MP tunnels, with FIG. 11A showing an ICMP redirect cooperation scheme and FIG. 11B showing a multi-casting scheme.
Figure 11B:
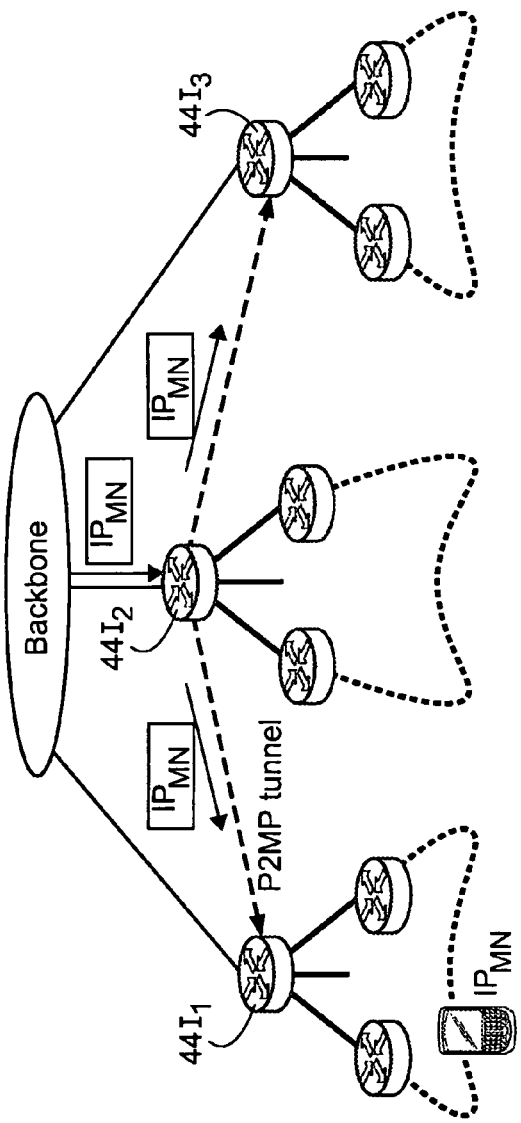

FIG. 11A and FIG. 11B illustrate example embodiments of an overlay mobile network 40 having a cooperation scheme among ingress mobility aware routers. This cooperation is based on Internet Control Message Protocol (ICMP), or multicasting. Regarding Internet Control Message Protocol, see, e.g., J. Postel, Internet Control Message Protocol, RFC 792, September 1981.

In the first case shown in FIG. 11A, when an ingress MAR 44I installs a route to a mobile node 30, it sends ICMP redirect messages to the remaining ingress mobility aware routers in order to instruct them to redirect packets targeted to the mobile node to this MAR. In the case shown in FIG. 11B, each ingress mobility aware router (MAR) 44I roots a P2MP tunnel having the remaining ingress mobility aware routers (MAR) as egress. When a packet reaches an ingress mobility aware router, it consults its mobile routing table. If no entry is found, the packet is multicasted through the P2MP tunnel to the remaining ingress mobility aware routers (one of them will forward the packet to the mobile node). The ICMP redirect scheme of FIG. 11A has the disadvantage of replicating routes to mobile nodes on the ingress mobility aware routers. Multicasting such as that depicted in FIG. 11B has a disadvantage of packet replication.

Example Advantages

The technology described herein, in its various embodiments and modes, provides numerous advantages.

The technology thus comprises, e.g., architecture and protocols for supporting mobility (e.g., micro-mobility) in networks, such as IP, MPLS, and GMPLS networks, for example. Support for such micro-mobility is a key issue and strategic in mobile IP networks since it significantly affects speeds up the handover process. A quicker and more efficient handover facilitated by efficient mobility handling advantageously minimizes, minimizing communication disruptions when a mobile node changes its network point of attachment. This invention proposes an architecture for supporting micro-mobility in IP, MPLS, and GMPLS networks. According to the invention As one aspect of the technology, the mobility is handled inside the network and the decision is based on the topology and not made by the mobile node as in Mobile IPv6 (MIPv6) protocol.

Further, the present technology avoids the tendency of other mobility architectures to require new functions for the mobile node (many of such functions not yet being widely available). Yet further, the technology is compatible with many types of networks, such as IP, MPLS, and GMPLS networks, for example. Moreover, in view of aspects such as tunneling, traffic engineering can be advantageously and easily performed.

The technology need not be tightened to IPv6, being deployable on both IPv4 and IPv6 networks. Since it relies on tunneling, also mixed deployments with IPv4 on the access network and IPv6 on the transport network are possible, and vice-versa.

The technology need not be affected by middle boxes such as firewall and NAT boxes placed anywhere on the access, transport, or backbone networks.

The technology need not make demands such as complex protocols such as MIPv6 on the mobile nodes. Since it relies only on the standard IP protocol stack, the solution supports all the commercially available mobile nodes based on, for instance, Windows Mobile, Symbian, and PalmOne operating systems. The architecture does not forbid enhancements deployed on the mobile nodes in order to improve handover speed and security, for instance. Such enhancements can be installed on user space or on the operating system kernel (e.g., as device drivers).

The technology can preserve the L3 address of the mobile nodes when they roam inside the access network, causing no disruption on transport connections maintained by the mobile nodes.

The technology need not restrict the mobile node to employ macro-mobility protocols such as MIPv6 and HIP (Host Identity Protocol).

The technology can comply with security mechanisms related to L2 (e.g., Wireless Protected Access—WPA), L3 (e.g., IP Security—IPSec), and L4+(e.g., Secure Socket Layer—SSL, HTTP Secure—HTTPS).

The technology can combine P2MP tunneling management, QoS/CoS management, and mobile node location tracking into the same protocol (RSVP-TE), reducing implementation and operating costs.

The technology need not interfere with services already deployed on the transport network, such as VPN and VoIP, for example.

The technology need not employ unusual protocols, as well standardized protocols can be employed by the architecture. When extensions to protocols are necessary they are introduced as opaque objects already foreseen by these protocols.

Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art. All structural, chemical, and functional equivalents to the elements of the above-described preferred embodiment that are known to those of ordinary skill in the art are intended to be encompassed hereby. Moreover, it is not necessary for a device or method to address each and every problem sought to be solved.

The invention claimed is:

1. A method of operating a telecommunications system comprising a transport network arranged between a wireless access network and a backbone network, the method comprises:
providing an overlay mobile network through the transport network, the overlay mobile network comprising a point-to-multipoint tunnel having tunnel segments formed in a tree topology, the point-to multipoint tunnel connecting mobility aware routers, the mobility aware routers being located in the transport network between the backbone network and one or more access points of the wireless access network;
using the mobility aware routers of the transport network as nodes of the tree topology; and,
selecting at least one of the mobility aware routers as a first ingress mobility aware router to direct traffic to a mobile node based on updated network topology information distributed to the mobility aware routers by routing protocols, wherein a first ingress mobility aware router is configured to install a route to the mobile node and to instruct a second ingress mobility aware router to redirect traffic, received by the second ingress mobility aware router but directed to the mobile node, to the first ingress mobility aware router, and wherein the first and second ingress mobility aware routers are connected to the backbone network and cooperate with one another to direct traffic to the mobile node.

2. The method of claim 1, wherein the updated network topology information is stored in said at least one of said mobility aware routers.

3. The method of claim 1, further comprising performing mobility functions which interact in a mobility plane to provide a mobile node with a layer 3, L3, address.

4. The method of claim 1, further comprising using a policy stored in said at least one of the mobility aware routers for selecting a top-most anchor point in the topology tree.

5. The method of claim 1 further comprising supporting micro-mobility in one or more of an Internet Protocol (IP) network, a MPLS (Multiprotocol Label Switching) network, and a GMPLS (Generalized MPLS) network.

6. The method of claim 3, wherein said at least one of said mobility aware routers perform the mobility operations, said mobility operations performing a location update procedure with respect to the layer 3 address of the mobile node.

7. The method of claim 6, wherein the mobility operations comprise:
a Tunnel Management operation configured to establish, shutdown, and when necessary re-route the tunnel;
a Mobile Routing operation configured to track an actual point of attachment of the mobile node and to route traffic to the mobile node's correct location;
an Address Configuration operation configured to supply Layer 3 addresses to a mobile node when the mobile node connects or reconnects to the wireless access network;
a Handover Helper operation configured to facilitate a handover process.

8. The method of claim 1, further comprising maintaining routes to mobile nodes and to direct traffic to a specific mobile node rather than to replicate the traffic along plural segments of the tree topology.

9. The method of claim 1, wherein the mobility aware routers comprise the ingress mobility aware routers, one or more branch mobility aware routers, and one or more egress mobility aware routers, wherein tunnel segments exist between each of the mobility aware routers, and wherein the egress mobility aware routers are connected to said access points of the wireless access network, the access points serving one or more mobile nodes.

10. The method of claim 9, wherein plural point-to-multipoint tunnels are configured, each of the point-to-multipoint tunnels being rooted by an ingress mobility aware router.

11. The method of claim 1, wherein at least one of the plural ingress mobility aware routers is configured to root a tunnel to others of the plural ingress mobility aware routers, and wherein the method further comprises, when the at least one of the plural ingress mobility aware routers does not serve the mobile node but receives traffic for the mobile node, the at least one of the plural ingress mobility aware routers multicasting the traffic to the others of the plural ingress mobility aware routers.

12. A router in a telecommunications system comprising, the router being arranged to comprise an overlay network,
the overlay network comprising a point-to-multipoint tunnel having tunnel segments formed in a tree topology, the point-to-multipoint tunnel connecting the router and another router, the router and the another router being located between a backbone network and access points of a wireless access network;
the router being configured to dynamically direct traffic to a mobile node
based on updated network topology information received through routing protocols and using knowledge about the mobile node, wherein the overlay network comprises a first mobility aware router and a second mobility aware router connected to the backbone network and which cooperate with one another to direct traffic to the mobile node, and wherein the first mobility aware router is configured to install a route to the mobile node and to instruct the second mobility aware router to redirect traffic, received by the second mobility aware router but directed to the mobile node, to the first mobility aware router.

13. The router of claim 12 further being configured to store said updated network topology information in the router.

14. The router of claim 12 further configured to perform mobility functions which interact in a mobility plane to provide a mobile node with a layer 3 (L3) address.

15. The router of claim 12 further configured to store policy controlling said configuring.

16. The router of claim 12 further configured to support micro-mobility in one or more of an Internet Protocol (IP) network, a MPLS (Multiprotocol Label Switching) network, and a GMPLS (Generalized MPLS) network.

17. The router of claim 14 further configured to perform a location update procedure with respect to the layer 3 address of the mobile node.

18. The router of claim 17 further configured to perform mobility operations comprising:
a Tunnel Management operation to establish, shutdown, and when necessary re-route the point-to-multipoint tunnel;
a Mobile Routing operation to track an actual point of attachment of the mobile node and to route traffic to the mobile node's correct location;
an Address Configuration operation to supply Layer 3 addresses to a mobile node when the mobile node connects or reconnects to the wireless access network;
a Handover Helper operation to facilitate a handover process.

19. The router of claim 12, wherein the router maintains routes to mobile nodes and directs traffic to a specific mobile node rather than to replicate the traffic along plural segments of the tree topology.

20. The router of claim 12, wherein the router is one of an ingress mobility aware router, a branch mobility aware router, and an egress mobility aware router.

21. The router of claim 20, wherein, when the router is the first ingress mobility aware router, and when plural point-to-multipoint tunnels are configured in the overlay network, each of the point-to-multipoint tunnels is rooted by the ingress mobility aware router, and wherein when the transport network comprises the second ingress mobility aware router, the first ingress mobility aware router cooperates with the second ingress mobility aware router to determine how to direct traffic to the mobile node.

22. The method of claim 9, further comprising:
encapsulating a packet according to tunnel information at the ingress mobility aware router and then forwarding the packet through a first chosen tunnel segment to a branch mobility aware router;
at the branch mobility aware router:
decapsulating the packet;
making a decision through which further tunnel segment to forward the packet; and
encapsulating the packet with further tunnel information according to the decision;
decapsulating the packet of tunnel information at the egress mobility aware router before delivering the packet to a destination access point.

23. A mobile transport network comprising:
plural mobility aware routers which comprises a point-to-multipoint tunnel having tunnel segments formed in a tree topology, the point-to multipoint tunnel connecting the plural mobility aware routers, the mobility aware routers being located between a backbone network and access points of a wireless access network;
the plural mobility aware routers being configured to direct traffic to a mobile node based on updated network topology information distributed to the plural mobility aware routers by routing protocols, the plural mobility aware routers comprising:
one or more ingress mobility aware routers;
one or more branch mobility aware routers; and
one or more egress mobility aware routers;
wherein tunnel segments exist between each of the plural mobility aware routers;
wherein the ingress mobility aware routers are connected to the backbone network and egress mobility aware routers are connected to access points of the wireless access network, the access points serving one or more mobile nodes, wherein a first ingress mobility aware router is configured to install a route to the mobile node and to instruct a second ingress mobility aware router to redirect traffic, received by the second ingress mobility aware router but directed to the mobile node, to the first ingress mobility aware router, and wherein the first and second ingress mobility aware routers cooperate with one another to direct traffic to the mobile node.

24. The mobile transport network of claim 23, wherein:
one or more of the ingress mobility aware routers are configured to encapsulate a packet according to tunnel information associated with the point-to-multipoint tunnel and then forward the packet through a first chosen tunnel segment of the point-to-multipoint tunnel to the branch mobility aware router;
the branch mobility aware router is configured to:
decapsulate the packet;
make a decision through which further tunnel segment to forward the packet; and
encapsulate the packet with further tunnel information according to the decision;
the egress mobility aware router is configured to decapsulate the packet of tunnel information before delivering the packet to a destination access point.

* * * * *